Dec. 30, 1930.  H. G. SPILSBURY  1,787,056

WELDING PROCESS

Filed Aug. 27, 1927

Inventor
Hugh G. Spilsbury
By his Attorney
Albert M. Austin

Patented Dec. 30, 1930

1,787,056

UNITED STATES PATENT OFFICE

HUGH G. SPILSBURY, OF CRANFORD, NEW JERSEY, ASSIGNOR, BY MESNE ASSIGNMENTS, TO FRANCIS EARLE, OF MONTCLAIR, NEW JERSEY

WELDING PROCESS

Application filed August 27, 1927. Serial No. 215,769.

This invention relates to a process for welding and more particularly to a method of welding by the application of super-heated molten metal as in the aluminothermic process.

This invention relates specifically to the butt welding of rails in accordance with the aluminothermic process, wherein a quantity of super-heated molten metal is placed in contact with the abutting rails and utilized for heating the rails to a welding temperature. For this purpose a mold is located adjacent the proposed rail joint and is adapted to receive the molten metal and direct the same around the various portions of the rail. The two rail sections are tightly clamped and when heated to the required welding temperature are forced into firm engagement whereby the adjacent surfaces may be butt welded, the surrounding metal which has been placed in the mold serving to further strengthen the joint.

In welding by the above mentioned process it is essential to evenly distribute the stress over the various portions of the rail section whereby buckling and other disagreeable features may be prevented. Furthermore, the portions to be butt welded must be kept in a clean condition and all foreign substances which would interfere with the successful welding operation must be eliminated.

This invention provides for butt welding a portion of the rail, as for example, the rail head and rail base when these portions have been raised to the required temperature by the superheated molten metal. The remaining portion such as the rail web is joined by the superheated metal itself, which upon cooling is caused to unite firmly therewith.

The invention further provides for the cutting away of a portion of the rail faces being joined, as for example, the web portion whereby the molten metal may run through the opening between the adjacent webs and be applied equally to the two sides of the rail. The head and base being placed in abutting relationship serve to hold the rail in alignment and prevent any buckling which would otherwise tend to occur. The butt welding of these portions is facilitated by the addition of a suitable flux, preferably in a solid form, whereby it may be readily placed between the adjoining faces of abutting rails.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a plan view of a pair of rails in position to be butt welded with the clamping means and mold in place;

Like reference characters denote like parts in the several figures of the drawings.

In the following description and in the claims the various steps in the process and the details comprising the invention will be identified by specific names for convenience but they are intended to be as generic in their application as the art will permit.

Figure 1:
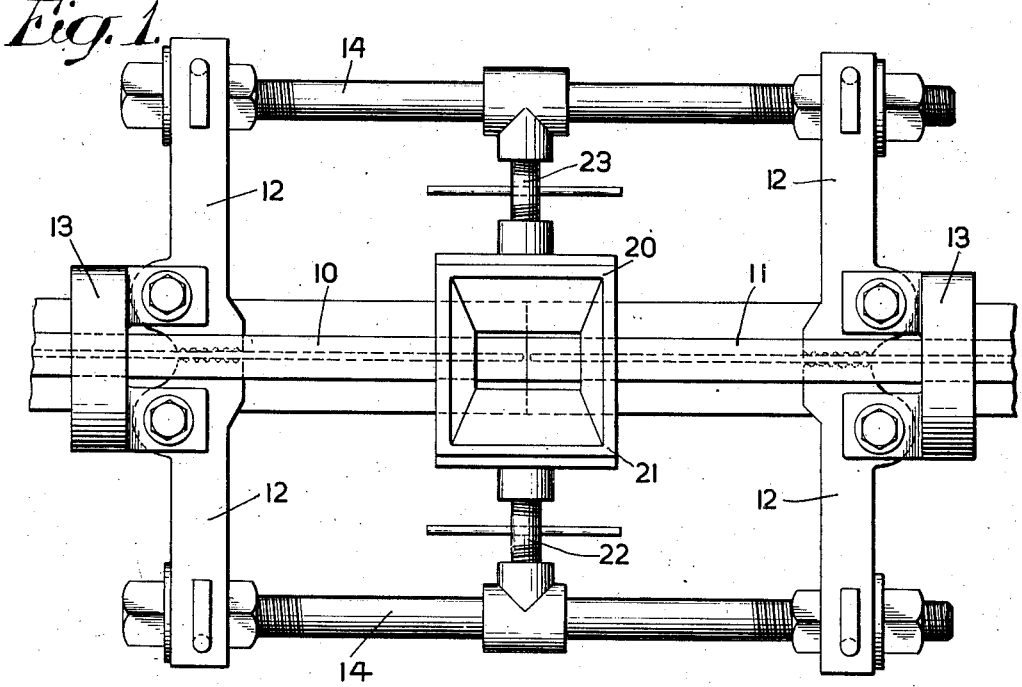
Figure 3:
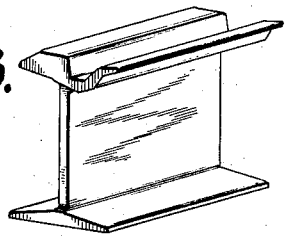
Fig. 3 is a perspective view of a lip or guard rail showing the web cut away for welding.

Referring to the drawings more in detail, the invention is shown as applied to a pair of rails 10 and 11 (Figs. 1 and 2) arranged in abutting relationship. Suitable clamping means, such as arms 12, supported on opposite sides of the rail web by means of yoke 13 may be employed for firmly engaging the sides of the rail and applying longitudinal pressure thereto. Connecting members 14 may be located between the ends of the respective arms 12 on the same side of the rail and utilized for applying force in a direction transverse to the said arms, causing the same to swing about their pivotal connection with yoke 13 whereby in a single operation the arms are brought into firm engagement with the sides of the rail web and are caused to apply a longitudinal stress thereto. The particular clamping means employed, however, forms no part of the present invention, and consequently will not be described in detail herein.

Figure 4:
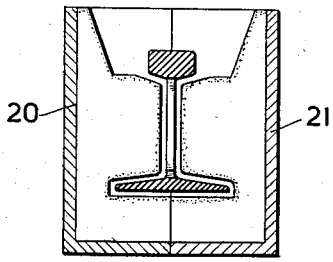
Fig. 4 is a sectional view of the rail and mold showing the relative location of the parts.

A mold comprising a pair of sections 20 and 21 (Figs. 1 and 4) is positioned about the abutting rail sections and pressed into operative relationship as by means of threaded rods 22 and 23 extending between said mold sections and clamping rods 14. Rods 22 and 23 may be threaded in reverse directions on their two ends whereby a simple turning movement may be employed for applying pressure to the sides of the mold sections.

Figure 2:
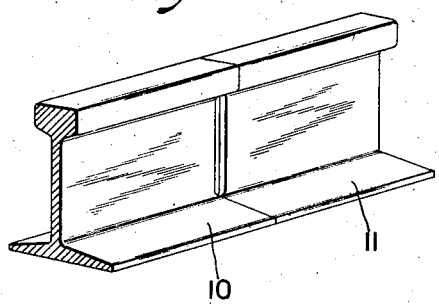
Fig. 2 is a perspective view of a pair of rails in welding position showing the webs cut away.

In the welding operation carried on in accordance with the present invention, a pair of rails are placed in abutting relationship as shown in Fig. 2 and a portion of the adjoining webs of the two rails is cut away. The exact amount of web removed is comparatively unimportant although a sufficient amount thereof should be cut out to provide space for the molten metal to flow between the webs from one side of the rail to the other when the mold is in place. A space of approximately one half inch between rails has been found satisfactory.

After the rails have been placed as above described, a flux material is placed between the adjoining rail heads. One form of flux which has been found suitable for this purpose comprises a solid cake formed of borax enmeshed in an iron screen. Finely ground ferrous material may be added to said borax if desired, and has been found to improve the qualities of the weld. The iron wires of the screen serve to hold the flux in cake form, and due to their high heat conductivity assist in uniformly heating the various portions of the face of the rail heads.

After the rails have been prepared as above described, clamping members are affixed and sufficient pressure is applied thereto to hold the two rails in firm abutting engagement. The mold may then be positioned around the joint and firmly clamped in position.

In order to conserve the amount of molten metal required to bring the rail to the proper welding temperature, the rail may be preheated as by directing the flame from a heating torch thereon. The space between adjacent rail webs which has been obtained by reason of the cut-away portions will then permit the flame to pass between the rails and evenly heat the two sides thereof.

After the rail has been preheated to the required temperature, the flame may be removed and superheated molten metal from any desired source, such as an aluminothermic reaction pot may be run into the mold. In accordance with the present invention an amount of metal should be run in sufficient to surround the rail web and rail base and to reach to the under-surface of the rail head. The slag which follows the metal should be allowed to surround the top and sides of the rail head. The flux material will prevent the slag from entering between the rail heads and contaminating the surface thereof, while the molten metal itself is permitted to freely enter between the adjacent sections of the rail base and the rail web.

The heat from the slag is utilized for quickly bringing the rail head to the welding temperature. Pressure is then applied to the clamping device and the two rails forced together under sufficient pressure to squeeze the heated flux from between the adjacent heads and bring the metal of these sections into firm engagement.

At the same time the molten metal will be forced from between the rail bases whereby a butt weld of both the head and the base may be obtained. The molten metal will, however, unite with the two sides of the rail web and will extend through the cut-away portions thereof to firmly unite the same and complete the weld.

By cutting the two adjacent rail webs as described above the rail heads and the rail bases are allowed to come into firm engagement thereby preventing a bridging action which would tend to occur were the heads only in engagement. These sections thus assist in holding the two rails in alignment during the welding process while the molten metal is being applied.

By removing a portion of the rail webs the rails may be preheated uniformly, since the preheating flame is allowed to extend between the two rails. Were the webs not cut-away it would be necessary for the flame to extend around the base of the rail, or to heat the side removed from the point of application thereof by means of heat conducted through the material of the rail.

The amount of molten metal applied to each side of the rail is equalized by allowing the same to flow between the two rail webs. The height of the molten metal and consequently the slag line thereon may be thus controlled. This feature is particularly important where it is desired to cause a butt weld of two rail heads by means of the heat obtained from the slag flowing upon the molten metal.

By maintaining the same level of metal on both sides of the rail, shrinkage during cooling is equalized, and the tendency of the rail to bend or twist sideways is eliminated.

This process furthermore reduces the quantity of material required in making the weld, and results in a great saving in cost of operation. The amount of material required to heat a rail to the desired degree was reduced by at least 25% in accordance with the present process, whereas the cost of cutting the slot in adjacent rail webs is practically negligible.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of welding rails which comprises locating a pair of rails with the heads and base portions abutting, providing a space between adjacent web sections, applying superheated molten metal about said rails whereby the head and base sections may be heated to the welding temperature and the molten metal permitted to unite with the adjacent web sections, and applying abutting longitudinal pressure to the rails to form an integral unitary rail.

2. The process of rail welding which comprises placing a pair of rails in aligned relationship, removing adjacent sections from the webs thereof, inserting a filler of flux material between the head portions thereof, applying superheated molten metal to said rails whereby adjoining portions of the abutting faces are brought into welding temperatures, applying longitudinal pressure to said rails so as to effect a butt weld of said base and head portions while permitting said molten metal to pass between the adjacent web section and unite therewith.

3. The process of rail welding which comprises placing said rails in abutting relationship, bringing the rail bases and rail heads to a welding temperature, applying longitudinal pressure so as to effect a butt weld of said base and head while joining the web portions of said rails by a superheated molten metal.

4. The process of rail welding which comprises removing a portion of the adjacent rail webs, placing a pair of rails in abutting relationship, bringing the portions of the bases and head adjacent the abutting faces to a welding temperature, applying longitudinal pressure to the rails to effect a butt weld and joining said webs by superheated molten metal.

5. The process of welding metallic elements which comprises heating the outer portions thereof to a welding temperature, applying longitudinal pressure while said outer portions are in abutting relationship in order to form a butt weld, and joining the inner portions by a metal insert.

In testimony whereof I have hereunto set my hand.

HUGH G. SPILSBURY.